(12) United States Patent
Nataraj et al.

(10) Patent No.: US 11,854,113 B2
(45) Date of Patent: Dec. 26, 2023

(54) DEEP LEARNING METHODS FOR EVENT VERIFICATION AND IMAGE RE-PURPOSING DETECTION

(71) Applicant: Mayachitra, Inc., Santa Barbara, CA (US)

(72) Inventors: Lakshmanan Nataraj, Goleta, CA (US); Michael Gene Goebel, Santa Barbara, CA (US); Bangalore S. Manjunath, Santa Barbara, CA (US); Shivkumar Chandrasekaran, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 167 days.

(21) Appl. No.: 17/088,132

(22) Filed: Nov. 3, 2020

(65) Prior Publication Data

US 2021/0209425 A1 Jul. 8, 2021

Related U.S. Application Data

(60) Provisional application No. 62/957,021, filed on Jan. 3, 2020.

(51) Int. Cl.
| | |
|---|---|
| *G06K 9/00* | (2022.01) |
| *G06T 1/00* | (2006.01) |
| *G06F 16/55* | (2019.01) |
| *G06T 3/40* | (2006.01) |
| *G06N 3/04* | (2023.01) |

(Continued)

(52) U.S. Cl.
CPC .......... *G06T 1/0028* (2013.01); *G06F 16/55* (2019.01); *G06F 18/213* (2023.01); *G06F 18/22* (2023.01); *G06F 18/2415* (2023.01); *G06F 18/2431* (2023.01); *G06N 3/04* (2013.01); *G06N 3/08* (2013.01); *G06T 3/40* (2013.01);

(Continued)

(58) Field of Classification Search
CPC .. G06K 9/6277; G06K 9/6201; G06K 9/6232; G06K 9/628; G06F 16/55; G06F 21/64; G06N 3/04; G06N 3/08; G06N 5/003; G06N 20/10; G06N 20/20; G06N 3/0454; G06T 3/40; G06T 2201/0201; G06T 1/0028; G06V 10/764; G06V 20/35; G06V 30/248; G06V 20/44
See application file for complete search history.

(56) References Cited

U.S. PATENT DOCUMENTS 9,542,621 B2 * 1/2017 He ....................... G06V 30/194
10,860,860 B1 * 12/2020 Huynh ............. H04N 21/23418
(Continued)

OTHER PUBLICATIONS

Goebel, M, et al., "Deep Learning Methods for Event Verification and Image Repurposing", arXiv.org > cs > arXiv:1902.04038, (Feb. 11, 2019), 7 pgs.

*Primary Examiner* — Dhaval V Patel
(74) *Attorney, Agent, or Firm* — Schwegman Lundberg & Woessner, P.A.

(57) ABSTRACT

Systems and methods herein describe accessing an image, generating a resized image, generating an image feature vector by applying an image classification neural network to the resized image, generating analysis of the image by processing the image feature vector using a machine-learning classifier trained to analyze the image feature vector, and based on the analysis, determining an event that is attributed to the image.

20 Claims, 9 Drawing Sheets

(51) Int. Cl.
G06N 3/08 (2023.01)
G06F 18/2415 (2023.01)
G06F 18/22 (2023.01)
G06F 18/213 (2023.01)
G06F 18/2431 (2023.01)
G06V 30/24 (2022.01)
G06V 10/764 (2022.01)
G06V 20/00 (2022.01)
*G06V 20/40* (2022.01)

(52) U.S. Cl.
CPC ............ G06V 10/764 (2022.01); G06V 20/35 (2022.01); G06V 30/248 (2022.01); *G06V 20/44* (2022.01)

(56) References Cited

U.S. PATENT DOCUMENTS

| | | | |
|---|---|---|---|
| 2019/0287685 A1* | 9/2019 | Wu | G06F 40/30 |
| 2021/0158138 A1* | 5/2021 | Hazra | G06F 3/017 |
| 2021/0182713 A1* | 6/2021 | Kar | G06K 9/6281 |

* cited by examiner

DEEP LEARNING METHODS FOR EVENT VERIFICATION AND IMAGE RE-PURPOSING DETECTION

PRIORITY

This application claims the benefit of priority to U.S. Provisional Patent Application Ser. No. 62/957,021, filed Jan. 3, 2020, which is incorporate by reference herein in its entirety.

This invention was made with Government support under Contract Number FA875016C0078 awarded by The Defense Advanced Research Projects Agency. The Government has certain rights in this invention.

TECHNICAL FIELD

Embodiments of the present disclosure relate generally to verifying image authenticity. More particularly, but not by way of limitation, the present disclosure addresses systems and methods for using deep learning in event verification and image repurposing detection.

BACKGROUND

The authenticity of images is an issue of growing concern. Thus, there is a need for improved methods and systems for verifying the authenticity of images for event verification and image re-purposing detection.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Social media websites are emerging as a dominant news source and verifying the validity of the news stories is necessary to protect against falsified news content. Images may be manipulated to deceive or otherwise promote false information. For example, images from previous pre-defined historic events (e.g., protests, races, storms, etc.) may be repurposed and used for new, future events to mislead a viewer. Detecting and identifying such image manipulations may be referred to by a process known as event verification. Pre-defined historic events may be defined by a specific time and/or location.

Embodiments herein describe an image verification system. The image verification system uses a neural network to solve the problems of event verification and image repurposing detection. The neural network may identify features within an image that can distinguish one event from another. For example, marathon race bibs are generally consistent for all participants in a single race, and different from other races. The neural network may identify image features within an image that can distinguish a first race from a second race.

The neural network (e.g., a deep learning classifier) may be represented as a composition of the two function f ($\bullet$) $\in R^{N \times K}$ and g ($\bullet$) $\in R^{K \times M}$ where f ($\bullet$) consists of a convolutional, non-linear and pooling layers, while g ($\bullet$) consists of a fully connected classification layer with M possible classes. During a training phase of the neural network, the parameters off and g may be learned using a large image database.

In some examples, an image verification system may extract features by mapping an entire image using f ($\bullet$) or g ($\bullet$) or both. In some examples, the parameters of f ($\bullet$) may be fine-tuned using an event data training set. In some examples, an image verification system may extract features by mapping image patches using g(f($\bullet$)). The output of the patches may be averaged or concatenated into one large image feature vector. A machine-learning classifier may be trained on extracted features to identify pre-defined historic events.

Figure 1:
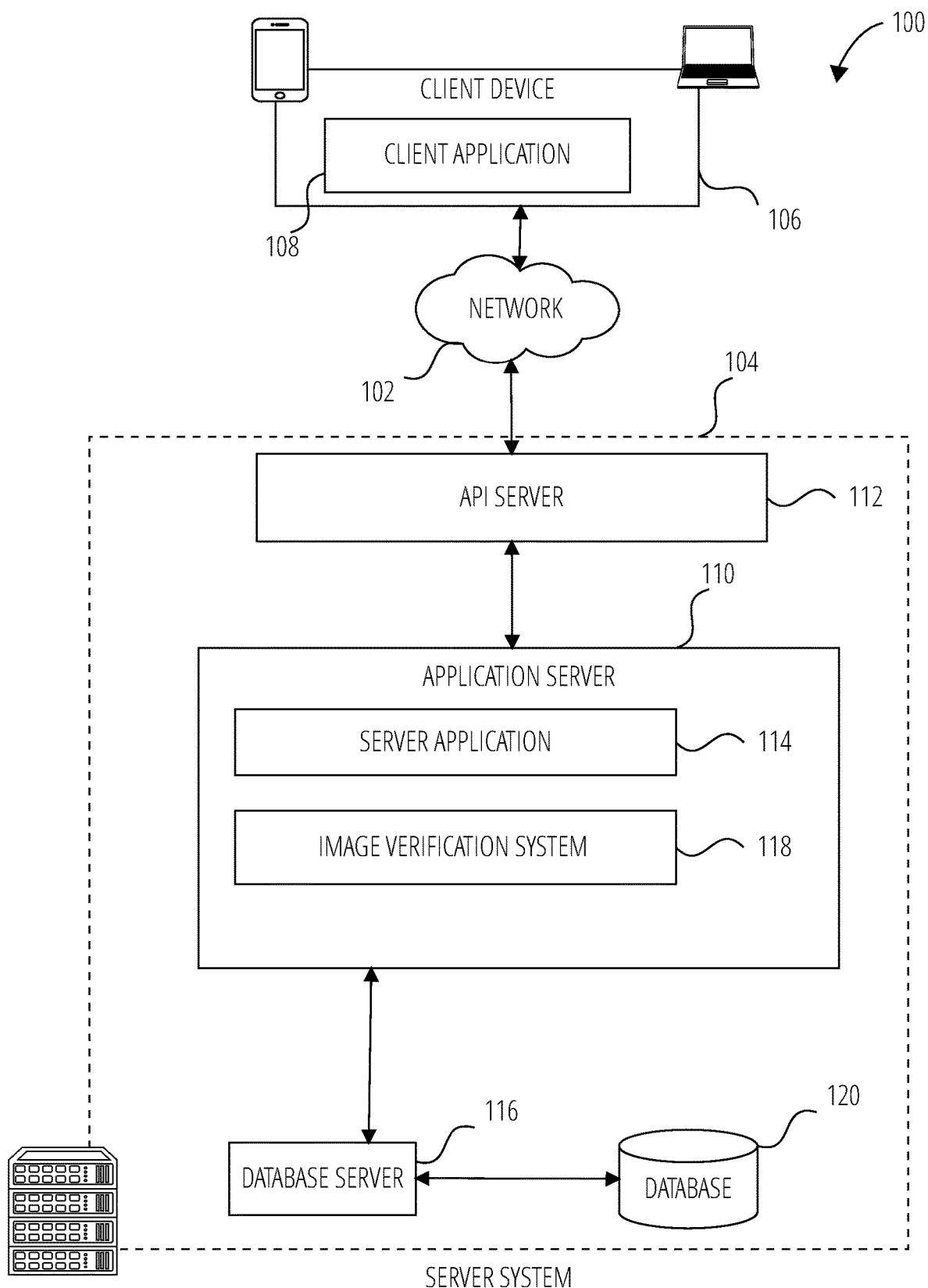
FIG. 1 is a diagrammatic representation of a networked environment in which the present disclosure may be deployed, in accordance with some example embodiments.

FIG. 1 is a block diagram showing an example system 100 for exchanging data (e.g., messages and associated content) over a network. The system 100 includes multiple instances of a client device 106, each of which hosts a number of applications including a client application 108. Each client application 108 is communicatively coupled to other instances of the client application 108 and a server system 104 via a network 102 (e.g., the Internet).

A client application 108 is able to communicate and exchange data with another client application 108 and with the server system 104 via the network 102. The data exchanged between client application 108, and between a client application 108 and the server system 104, includes functions (e.g., commands to invoke functions) as well as payload data (e.g., text, audio, video or other multimedia data).

The server system 104 provides server-side functionality via the network 102 to a particular client application 108. While certain functions of the system 100 are described herein as being performed by either a client application 108 or by the server system 104, the location of certain functionality either within the client application 108 or the server system 104 is a design choice. For example, it may be technically preferable to initially deploy certain technology and functionality within the server system 104, but to later migrate this technology and functionality to the client application 108 where a client device 106 has a sufficient processing capacity.

The server system 104 supports various services and operations that are provided to the client application 108.

Such operations include transmitting data to, receiving data from, and processing data generated by the client application 108. This data may include, message content, client device information, geolocation information, as examples. Data exchanges within the system 100 are invoked and controlled through functions available via user interfaces (UIs) of the client application 108.

Turning now specifically to the server system 104, an Application Program Interface (API) server 112 is coupled to, and provides a programmatic interface to, an application server 110. The application server 110 is communicatively coupled to a database server 116, which facilitates access to a database 120 in which is stored data associated with messages processed by the application server 110.

The Application Program Interface (API) server 112 receives and transmits message data (e.g., commands and message payloads) between the client device 106 and the application server 110. Specifically, the Application Program Interface (API) server 112 provides a set of interfaces (e.g., routines and protocols) that can be called or queried by the client application 108 in order to invoke functionality of the application server 110. The Application Program Interface (API) server 112 exposes various functions supported by the application server 110.

The application server 110 hosts a number of applications and subsystems, including a server application 114, an image verification system 118.

The server application 114 implements a number of data processing technologies and functions. Other processor and memory intensive processing of data may also be performed server-side by the server application 114, in view of the hardware requirements for such processing.

The image verification system 118 verifies the authenticity of images using a deep neural network. For example, the image verification system 118 verifies the authenticity of image labels, such as event names. In some examples, the image verification system 118 uses features from the last convolutional layer of a pre-trained neural network as input to a classifier. In some examples, the image verification system 118 combines many features extracted from smaller scales and uses the output of a pre-trained network as input to a second classifier. Thus, the image verification system 118 may be used for event verification and image re-purposing detection.

The application server 110 is communicatively coupled to a database server 116, which facilitates access to a database 120 in which is stored data associated with messages processed by the server application 114.

Figure 2:
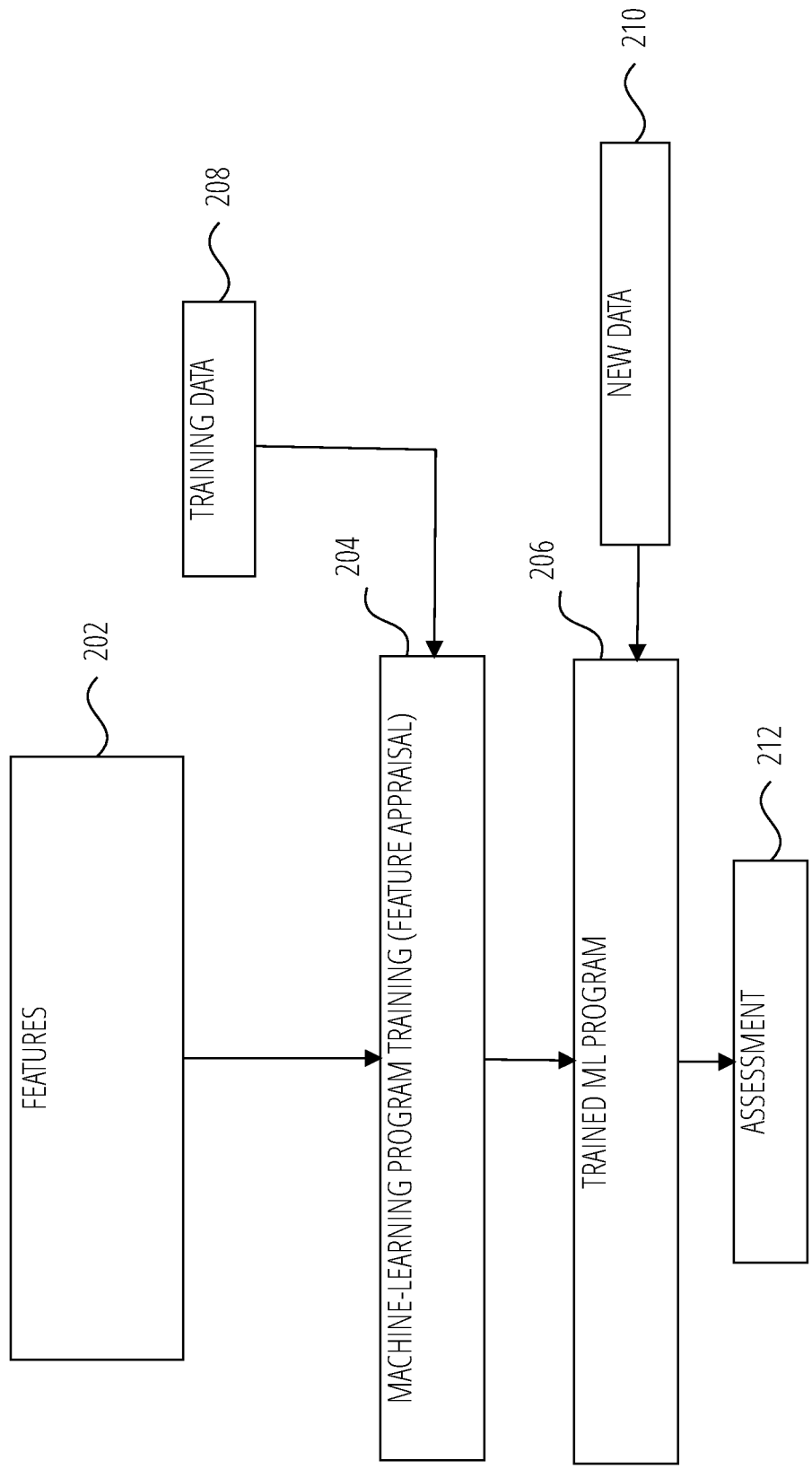
FIG. 2 is a block diagram illustrating an example of a machine upon or by which one or more example process embodiments described herein may be implemented or controlled.

FIG. 2 illustrates the training and use of a machine-learning program, according to some example embodiments. In some example embodiments, machine-learning programs (MLPs), also referred to as machine-learning algorithms or tools, are utilized to perform operations associated with malware classification. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 208 in order to make data-driven predictions or decisions expressed as outputs or assessment 212. Although example embodiments are presented with respect to a few machine-learning tools, the principles presented herein may be applied to other machine-learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a prediction probability to determine a pre-defined historic event attributed to the image. The machine-learning algorithms utilize the training data 208 to find correlations among identified features 202 that affect the outcome.

The machine-learning algorithms utilize features 202 for analyzing the data to generate an assessment 212. The features 202 are an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs. In one example embodiment, the features 202 may be of different types.

The machine-learning algorithms utilize the training data 208 to find correlations among the identified features 202 that affect the outcome or assessment 212. In some example embodiments, the training data 208 includes labeled data, which is known data for one or more identified features 202 and one or more outcomes, such as for event verification and image re-purposing detection.

With the training data 208 and the identified features 202, the machine learning tool is trained. During machine-learning program training 204 the machine-learning tool appraises the value of the features 202 as they correlate to the training data 208. The result of the training is the trained machine-learning program 206.

When the machine-learning program 206 is used to perform an assessment, new data 210 is provided as an input to the trained machine-learning program 206, and the machine-learning program 206 generates the assessment 212 as output. For example, when an image is accessed, the image is analyzed using a convolutional neural network (e.g., a machine learning model) trained to extract image features of the image. In some examples, the extracted image features may be further used as input to a second machine-learning classifier and the results of the second-machine learning classifier (e.g., a machine-learning model) may be used for event verification and image re-purposing detection.

Figure 3:
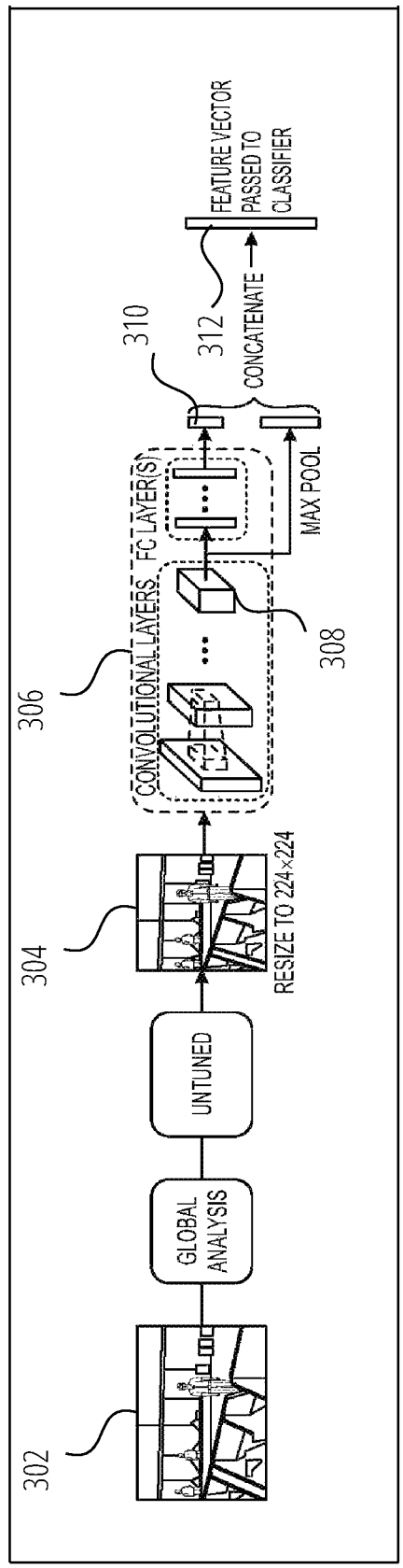
FIG. 3 is an illustration of an image verification system, according to one example embodiment.
Figure 4:
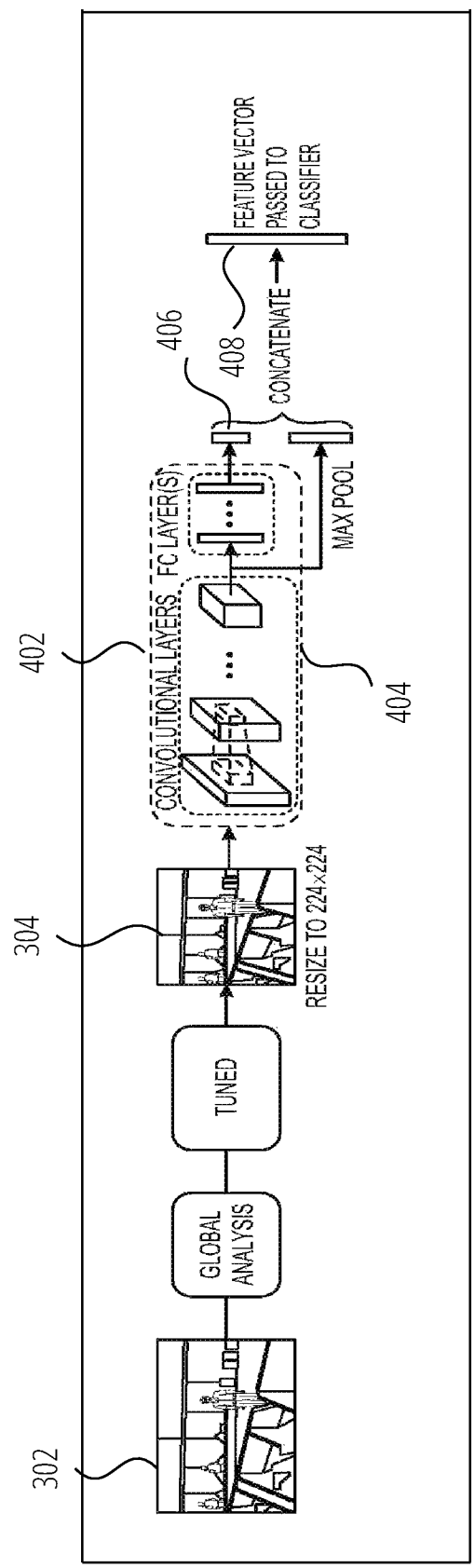
FIG. 4 is an illustration of an image verification system, according to one example embodiment.

FIGS. 3-4 are an illustration of image verification system 118 using a global analysis approach to event verification and image re-purposing detection, according to some example embodiments. The global analysis approach uses global image features. For example, in a global analysis approach, the image verification system 118 computes image features on an entire image.

The image verification system 118 accesses an image 302 from a computing device. In some examples the image 302 is received from a client device 106. The image verification system 118 generates a resized image 304 from the image 302. For examples, the image verification system 118 may generate a resized image 304 to match a resolution used by the convolutional neural network 306 (e.g., 224×224 or 299×299). In some examples the convolutional neural network 306 is an untuned neural network. The untuned network may use standard neural networks (e.g., ResNet-50) that are trained on an image dataset but not tuned to a dataset under test (e.g., images from a specific dataset that are being analyzed using the network 306). The final image feature vector 312 may be derived from the outputs from the last convolutional layer 308 and the fully connected layer 310. The last convolutional layer 308 generates a multi-dimensional data output. For example, the multi-dimensional data output may be a plurality of probabilities that the image 302 belongs to a particular image class as defined by the convolutional neural network 306. In some examples, the convolutional neural network 306 has a fixed set of classes (e.g., 1000 classes). The fully connected layer 310 receives the multi-dimensional data output as input and generates a single dimensional vector. The image verification system 118 concatenates the single dimensional vector with a max pooling layer and generates the image feature vector 312. Max pooling layers may provide an approach to down sampling feature maps by summarizing the most activated presence of a feature.

The image verification system 118 passes the image feature vector 312 a second machine learning model in order to determine a pre-defined historic event attributed to the image. The second machine learning model may be an extra trees model, random forest model, nearest neighbor model, support vector machine, or a convolutional net. It is to be understood that any suitable machine learning model or algorithm may be used as the second machine learning model.

In some examples, the image verification system 118 the convolutional neural network 402 is a tuned neural network. The tuned neural network is trained on a specific dataset. For example, the image verification system 118 may have a database of images from pre-defined historic events. The convolutional neural network 402 is re-trained on the database of images from pre-defined historic events so that it can identify images from those pre-defined historic events. In some examples, the convolutional neural network 402 is re-trained on a database of images from pre-defined historic events and the last fully connected layer of the convolutional neural network 402 is removed and replaced with a fully connected layer 406. The fully connected layer 406 may have a different number of outputs than the fully connected layer 310. The outputs of the fully connected layer 406 may represent the number of pre-defined historic events in the database of images. The image verification system 118 concatenates the fully connected layer 406 with a max pooling layer and generates an image feature vector 408. The image verification system 118 passes the image feature vector 408 to a second machine-learning model in order to determine a pre-defined historic event attributed to the image. The second machine-learning model may be an extra trees model, random forest model, nearest neighbor model, support vector machine, or a convolutional net. It is to be understood that any suitable machine learning model or algorithm may be used as the second machine learning model.

Figure 5:
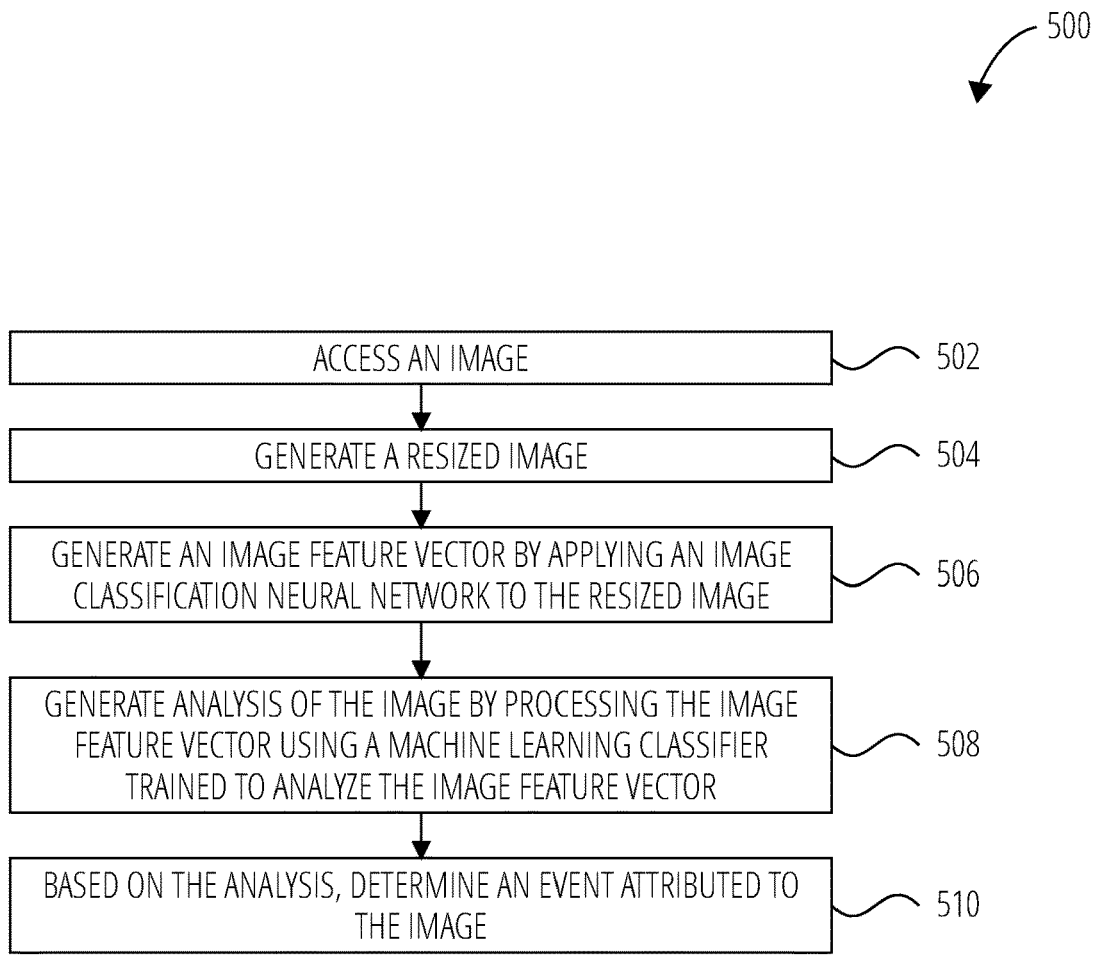
FIG. 5 is an example method for event verification and image re-purposing detecting, according to one example embodiment.

FIG. 5 is an example method for verifying the authenticity of images for event verification and image re-purposing detection, according to some example embodiments. The method 500 can be performed by the image verification system 118 in FIG. 1. In one embodiment, a processor (or circuitry dedicated to performing instructed tasks) included in the image verification system 118 performs the method 500 or causes the image verification system 118 to perform the method 500.

At operation 502, the image verification system 118 accesses, using one or more processors, an image. For example, the image may be the image 302. The image may be accessed via the network 102. In some examples, the image is retrieved from one or more databases 120.

At operation 504, the image verification system 118 generates a resized image using the image. For example, the resized image may be the resized image 304. At operation 506, the image verification system 118 generates an image feature vector by applying an image classification neural network to the resized image. In some examples, the image classification neural network may be the convolutional neural network 306. In some examples, the image classification neural network may be the convolutional neural network 402. As discussed above in FIGS. 3-4, the image classification neural network may have a convolutional layer that may output to a fully connected layer that generates the image feature vector. The convolutional layer may output a multi-dimensional dataset comprising a plurality of probabilities that the image belongs to a plurality of pre-defined image classes. The fully connected layer may receive the multi-dimensional dataset and convert the multi-dimensional dataset to a single dimensional vector.

In some examples, the image feature vector may be the image feature vector 312. In some examples, the image feature vector may be the image feature vector 408. In some examples the convolutional layer is the last convolutional layer 308. In some examples the convolutional layer is the last convolutional layer 404. In some examples, the fully connected layer is the fully connected layer 310. In some examples, the fully connected layer is the fully connected layer 406. The generated image feature vector may be stored in a database.

At operation 508, the image verification system 118 generates analysis of the image by processing the image feature vector using a machine-learning classifier trained to analyze the image feature vector. The machine-learning classifier may be the second machine-learning model as described above in connection with FIGS. 3-4. In some examples, the image verification system 118 accesses an image feature vector database. The image feature vector database may have a plurality of image feature vectors. The image verification system 118 may identify a feature vector from the database that matches the image feature vector generated at operation 506. For example, the image verification system 118 may identify a feature vector from the database that is identical to the generated image feature vector.

At operation 510, based on the analysis, the image verification system 118 determines an event that is attributed to the image. For example, the image verification system 118 may output a probability (e.g., confidence level) that the image (e.g., image 302) was captured at a pre-defined historic event.

For example, the image verification system 118 may perform the method 500 to validate the authenticity of an image used in an online or print news article. The news article may be reporting on a hurricane in Texas in October 2020. An image depicting destroyed homes may be used in the news article. The image verification system 118 may identify that the image used in the news article was actually attributed to a hurricane in Puerto Rico in September 2009. Thus, the image verification system 118 can verify the authenticity of the image through event verification and image re-purposing detection methods as described above.

Figure 6:
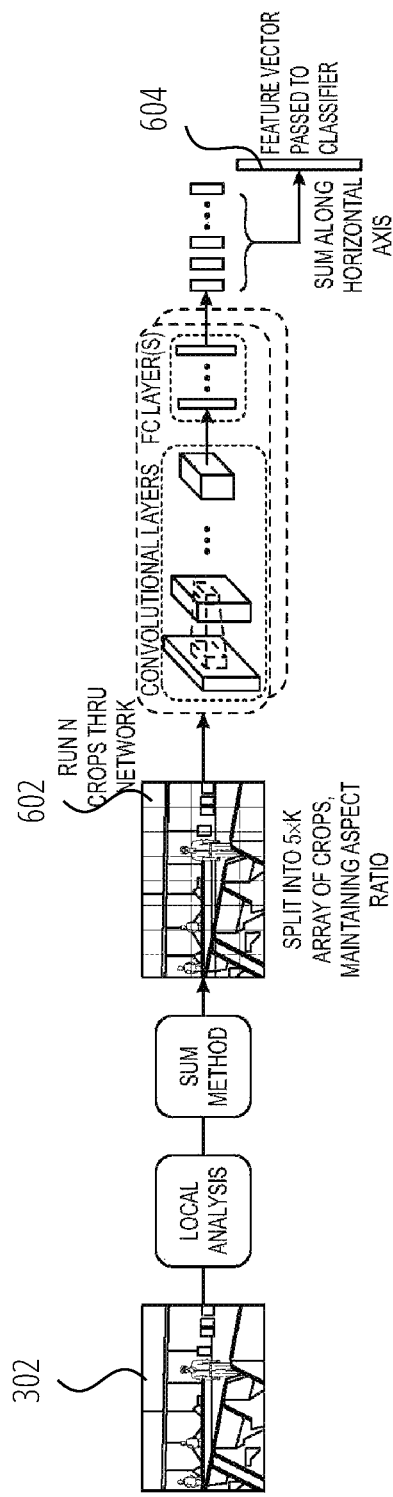
FIG. 6 is an illustration of an image verification system, according to one example embodiment.
Figure 7:
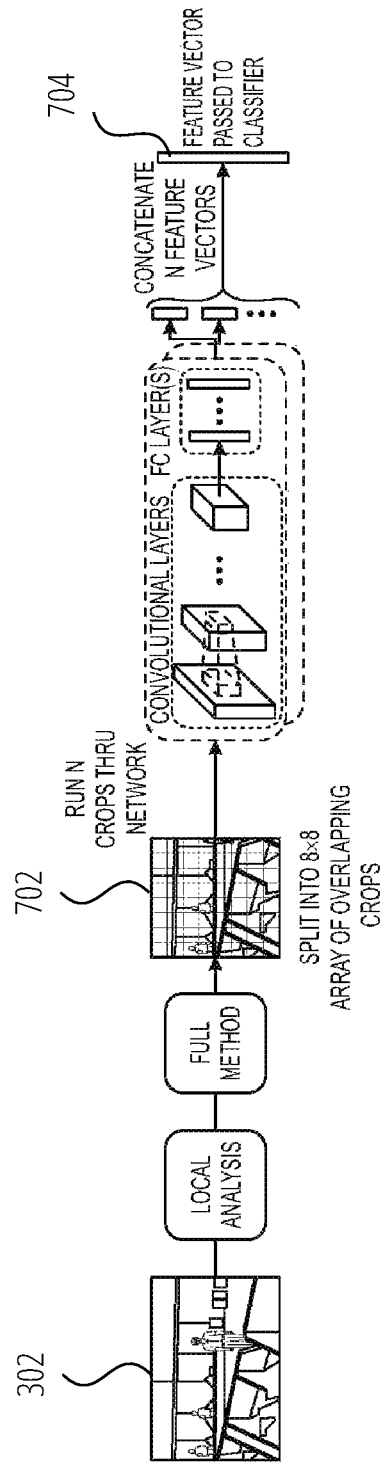
FIG. 7 is an illustration of an image verification system, according to one example embodiment.

FIGS. 6-7 are an illustration of image verification system 118 using a local analysis approach to event verification and image re-purposing detection, according to some example embodiments. The local analysis approach may divide the image 302 into sections and compute image features on the sections rather than the entire image. The local analysis approach may use a sliding window to extract image features from local image patches. The local analysis approach may derive its image feature vector from the output of the fully connected classification layer.

In some examples, the image verification system 118 uses sum features in the local analysis approach. The image verification system 118 may rescale each image to have a predefined number of rows (e.g., 1120) while preserving the aspect ratio of the original image. The image verification system 118 may divide the image into overlapping patches 602 (e.g., 224 pixels×224 pixels). Each patch may be processed through the convolutional neural network. The output vector for each patch may be summed and the resulting sum may be normalized to one. For example, the image verification system 118 may produce a multi-dimensional image feature vector 604. The image verification system 118 uses a second machine-learning classifier to analyze the image feature vector 604 and determine whether the image 302 was captured at a pre-defined event. The second machine-learning classifier may be a support vector machine, extra trees model, random forest model or an XGBOOST model.

In some examples, the image verification system 118 uses full features in the local analysis approach. By using full features, the image verification system 118 eliminates the sum over the patches 602 as described above. The image verification system 118 may rescale the image 302 to have pre-defined amounts of rows and columns (e.g., 1120 rows, 1120 columns). The image verification system 118 uses the convolutional neural network to produce an image feature vector for each of the patches 702. The final image feature vector 704 may be the concatenation of the output of all the feature vectors.

Figure 8:
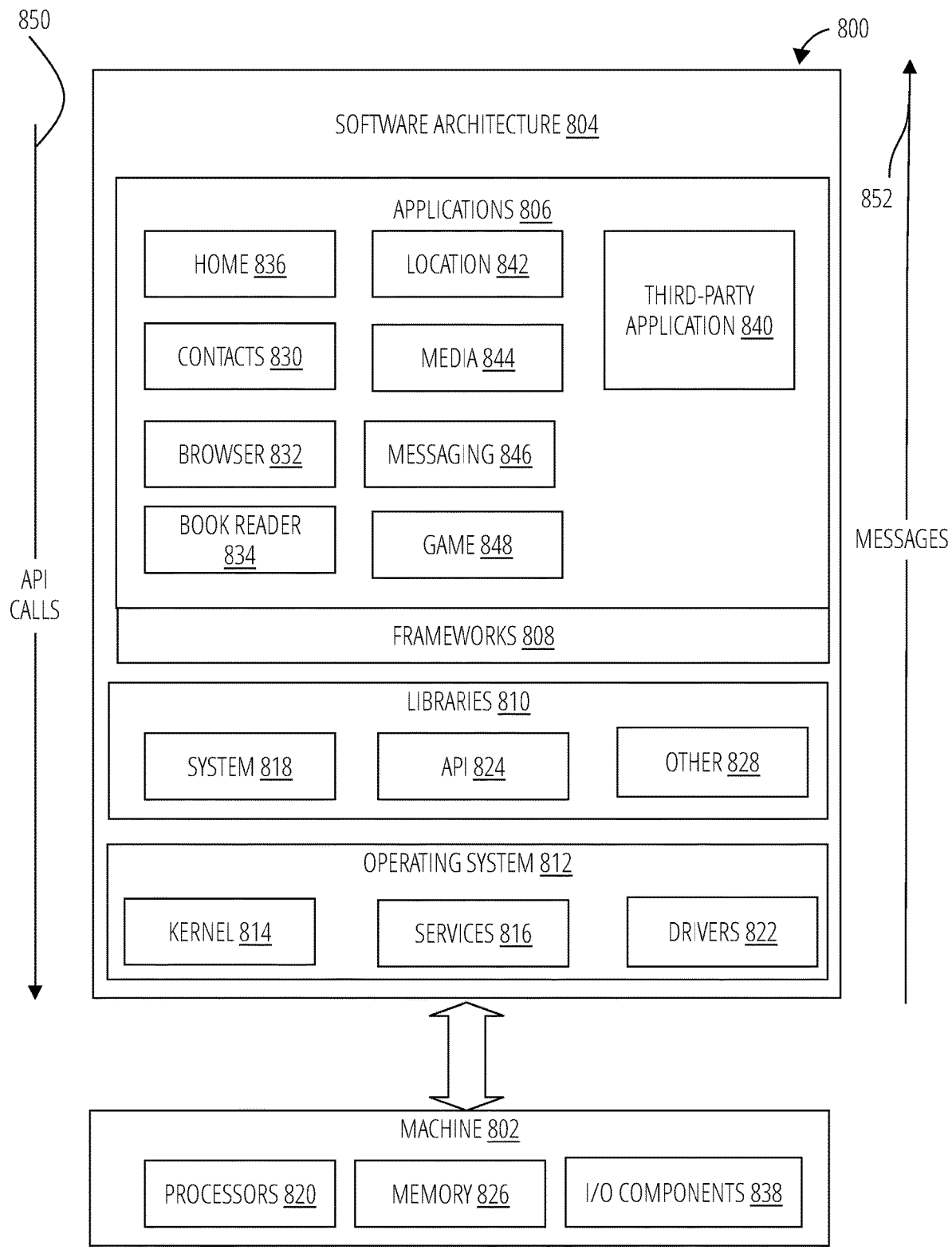
FIG. 8 is a block diagram showing a software architecture within which the present disclosure may be implemented, in accordance with example embodiments.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLU-ETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as a third-party application 840. The e applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Figure 9:
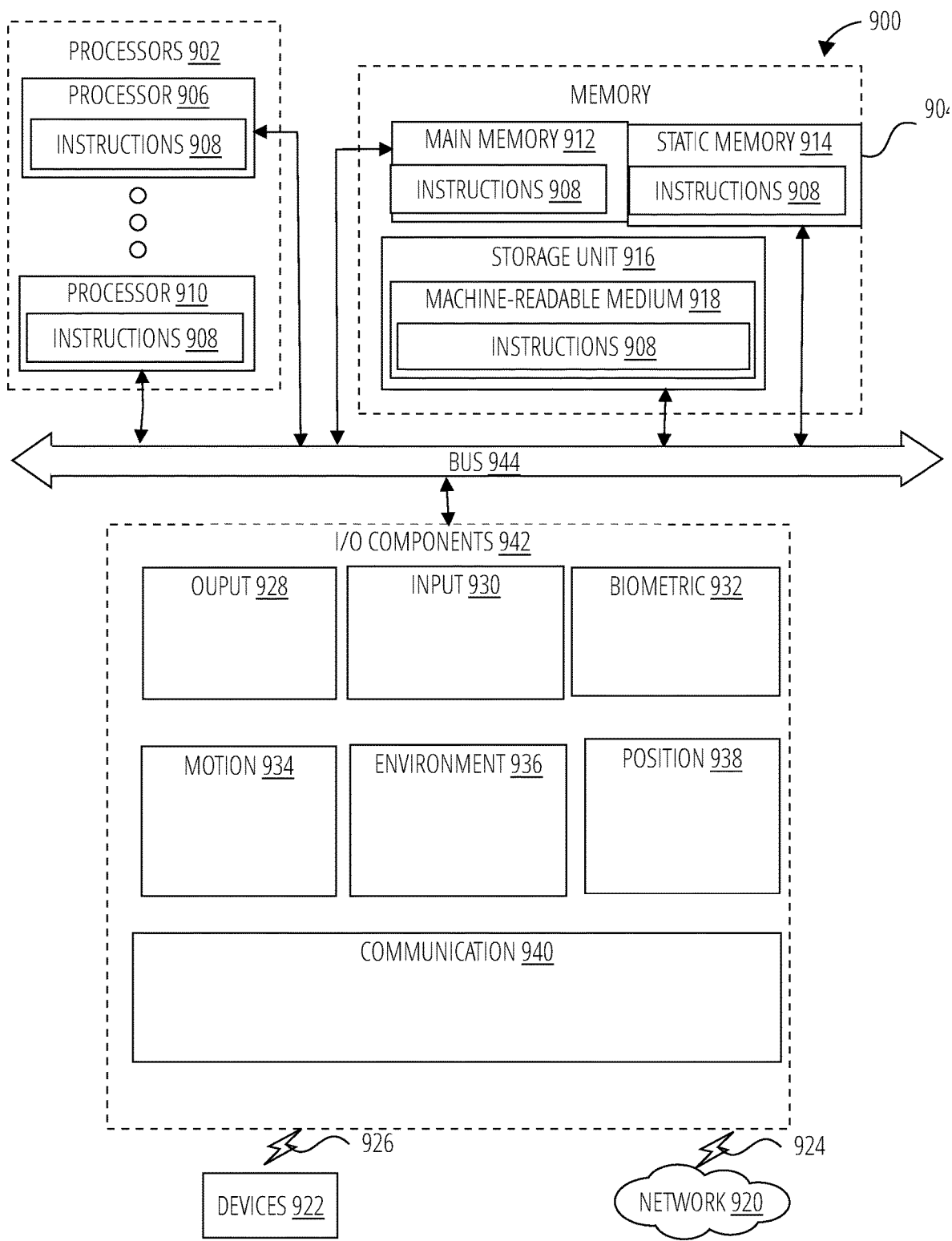
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked)

to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    accessing, using one or more processors, an image, the image being attributed to a first specific event designated by a first time period and a first location;
    generating a resized image using the image;
    generating an image feature vector by applying an image classification neural network to the resized image, the image classification neural network comprising a convolutional layer that outputs to a fully-connected layer that generates the image feature vector;
    generating analysis of the image by processing the image feature vector using a machine-learning classifier trained to analyze the image feature vector;
    based on the analysis, determining a second specific event designated by a second time period and second location that is attributed to the image, the second specific event being different than the first specific event; and
    authenticating the image based on a probability that the image was captured at the second specific event instead of the first specific event.

2. The method of claim 1 further comprising:
    storing the generated image feature vector in a database.

3. The method of claim 1, wherein the first specific event comprises a pre-defined historic event.

4. The method of claim 1, wherein the image classification neural network comprises a pre-trained convolutional neural network trained using a set of images.

5. The method of claim 1, wherein the image classification neural network is a fine-tuned convolutional neural network trained using a database of images, the database of images corresponding to pre-defined historic events.

6. The method of claim 1, wherein generating the analysis of the image further comprises:
    accessing an image feature vector database, the image feature vector database comprising a plurality of image feature vectors; and
    identifying a matching feature vector from the plurality of image feature vectors, the matching feature vector matching to the generated image feature vector.

7. The method of claim 1, wherein the machine-learning classifier is a nearest neighbor classifier.

8. The method of claim 1, wherein the convolutional layer outputs a multi-dimensional dataset comprising a plurality of probabilities that the image belongs to a plurality of pre-defined image classes.

9. The method of claim 8, further comprising:
    receiving, by the fully-connected layer, the multi-dimensional dataset; and
    converting the multi-dimensional dataset to a single dimensional vector.

10. A system comprising:
a processor; and
a memory storing instructions that, when executed by the processor, configure the processor to perform operations comprising:
accessing an image, the image being attributed to a first specific event designated by a first time period and a first location;
generating a resized image using the image;
generating an image feature vector by applying an image classification neural network to the resized image, the image classification neural network comprising a convolutional layer that outputs to a fully connected layer that generates the image feature vector;
generating analysis of the image by processing the image feature vector sing a machine-learning classifier trained to analyze the image feature vector;
based on the analysis, determining a second specific event designated by a second time period and second location that is attributed to the image, the second specific event being different than the first specific event; and
authenticating the image based on a probability at the image was captured at the second specific event instead of the first specific event.

11. The system of claim 10 wherein the operations further comprise:
storing the generated image feature vector in a database.

12. The system of claim 10, wherein the second specific event comprises a pre-defined historic event.

13. The system of claim 10, wherein the image classification neural network comprises a pre-trained convolutional neural network trained use a set of images.

14. The system of claim 10, wherein the image classification neural network comprises a fine-tuned convolutional neural network trained using a database of images corresponding to pre-defined historic events.

15. The system of claim 10, wherein generating the analysis of the image further comprises:
accessing an image feature vector database, the image feature vector database comprising a plurality of image feature vectors; and
identifying a matching feature vector from the plurality of image feature vectors, the matching feature vector matching to the generated image feature vector.

16. The system of claim 10, wherein the machine-learning classifier comprises a nearest neighbor classifier.

17. The system of claim 10, wherein the convolutional layer outputs a multi-dimensional dataset, the multi-dimensional dataset comprising a plurality of probabilities that the image belongs to a plurality of pre-defined image classes.

18. The system of claim 17, wherein the operations further comprise:
receiving, by the fully connected layer, the multi-dimensional dataset; and
converting the multi-dimensional dataset to a single dimensional vector.

19. A non-transitory computer-readable storage medium, the non-transitory computer-readable storage medium including instructions that when executed by a computer, cause the computer to perform operations comprising:
accessing an image, the image being attributed to a first specific event designated by a first time period and a first location;
generating a resized image using the image;
generating an image feature vector by applying an image classification neural network to the resized image, the image classification neural network comprising a convolutional layer that outputs to a fully connected layer that generates the image feature vector;
generating analysis of the image by processing the image feature vector using a machine-learning classifier trained to analyze the image feature vector;
based on the analysis, determining a second specific event designated by a second time period and second location that is attributed to the image, the second specific event being different than the first specific event; and
authenticating the image based on a probability that the image was captured at the second specific event instead of the first specific event.

20. The non-transitory computer-readable storage medium of claim 19 wherein the operations further comprise:
storing the generated image feature vector in a database.

* * * * *

UNITED STATES PATENT AND TRADEMARK OFFICE
CERTIFICATE OF CORRECTION

| | | |
|---|---|---|
| PATENT NO. | : 11,854,113 B2 | Page 1 of 1 |
| APPLICATION NO. | : 17/088132 | |
| DATED | : December 26, 2023 | |
| INVENTOR(S) | : Nataraj et al. | |

It is certified that error appears in the above-identified patent and that said Letters Patent is hereby corrected as shown below:

In the Claims

In Column 12, Line 24, in Claim 1, delete "fully-connected" and insert --fully connected-- therefor In Column 12, Line 64, in Claim 9, delete "fully-connected" and insert --fully connected-- therefor In Column 13, Line 17, in Claim 10, delete "sing" and insert --using-- therefor In Column 13, Line 23, in Claim 10, delete "at" and insert --that-- therefor Signed and Sealed this
Thirteenth Day of January, 2026

John A. Squires
*Director of the United States Patent and Trademark Office*